United States Patent [19]
Dutra et al.

[11] Patent Number: 5,369,686
[45] Date of Patent: Nov. 29, 1994

[54] METHOD AND APPARATUS FOR SECONDARY-OPTION MESSAGE DELIVERY THROUGH ENHANCED SERVICE MESSAGE HANDLERS

[75] Inventors: Antonio Dutra, Lebanon, N.H.; Gordon K. Kapes, Chicago; Randy S. Storch, Highland Park, both of Ill.

[73] Assignee: Open Port Technology, Inc., Skokie, Ill.

[21] Appl. No.: 17,285

[22] Filed: Feb. 12, 1993

[51] Int. Cl.$^5$ .......................................... H04M 11/00
[52] U.S. Cl. ...................................... 379/94; 379/93; 379/96; 379/97; 379/100
[58] Field of Search ........................ 379/67, 88, 89, 93, 379/94, 96, 97, 98, 100; 358/402, 407, 440, 468

[56] References Cited

U.S. PATENT DOCUMENTS

| | | | |
|---|---|---|---|
| 4,249,216 | 2/1981 | Kanda | 358/257 |
| 4,447,676 | 5/1984 | Harris et al. | 379/355 |
| 4,524,393 | 6/1985 | Ohzeki | 358/257 |
| 4,586,086 | 4/1986 | Ohzeki | 358/256 |
| 4,607,289 | 8/1986 | Kurokawa | 358/257 |
| 4,646,160 | 2/1987 | Iizuka et al. | 379/100 |
| 4,649,533 | 3/1987 | Chorley et al. | 379/94 |
| 4,652,700 | 3/1987 | Matthews et al. | 379/89 |
| 4,675,742 | 6/1987 | Ogata | 358/257 |
| 4,741,021 | 4/1988 | Kotani et al. | 379/100 |
| 4,747,127 | 5/1988 | Hansen et al. | 379/93 |
| 4,873,720 | 10/1989 | Son | 379/356 |
| 4,905,273 | 2/1990 | Gordon et al. | 379/93 |
| 4,922,348 | 5/1990 | Gillon et al. | 358/407 |
| 4,942,599 | 7/1990 | Gordon et al. | 379/93 |
| 4,969,184 | 11/1990 | Gordon et al. | 379/100 |
| 4,994,926 | 2/1991 | Gordon et al. | 358/440 |
| 5,014,300 | 5/1991 | Harvath et al. | 379/100 |
| 5,018,191 | 5/1991 | Catron et al. | 379/100 |

FOREIGN PATENT DOCUMENTS 61-276458 12/1986 Japan.

OTHER PUBLICATIONS

T. Kamae, "Development of a Public Facsimile Communication System Using Storage and Conversion Techniques," IEEE National Telecommunications Conference, Houston, Tex., U.S.A., Nov. 30 to Dec. 4, 1980, pp. 19.4.1 to 19.4.5.

*Primary Examiner*—Curtis Knutz
*Assistant Examiner*—Jason Chan
*Attorney, Agent, or Firm*—Kirkland & Ellis

[57] ABSTRACT

A system that facilitates the efficient transfer of digitally encoded messages comprising an enhanced service exchange device in combination with an enhanced service message handler. The system provides alternate delivery paths for digitally encoded messages after first attempting a point-to-point connection between the sending and receiving communicating devices. The system provides re-routing functionality for both the sending and receiving of data. For sending data, the enhanced service exchange monitors point-to-point message transfer failure parameters (such as device busy signals, no answer, or telephone network re-order signals). When such conditions are encountered, it re-directs the transfer attempt to an enhanced service message handler, which may then be used as a store-and-forward switch. For receiving data, messages are redirected to the enhanced service message handler if message transfer failure parameters are detected. Message-waiting notification or data delivery logic is then used to deliver the data at the earliest possible opportunity and without incurring any unnecessary connection costs.

48 Claims, 8 Drawing Sheets

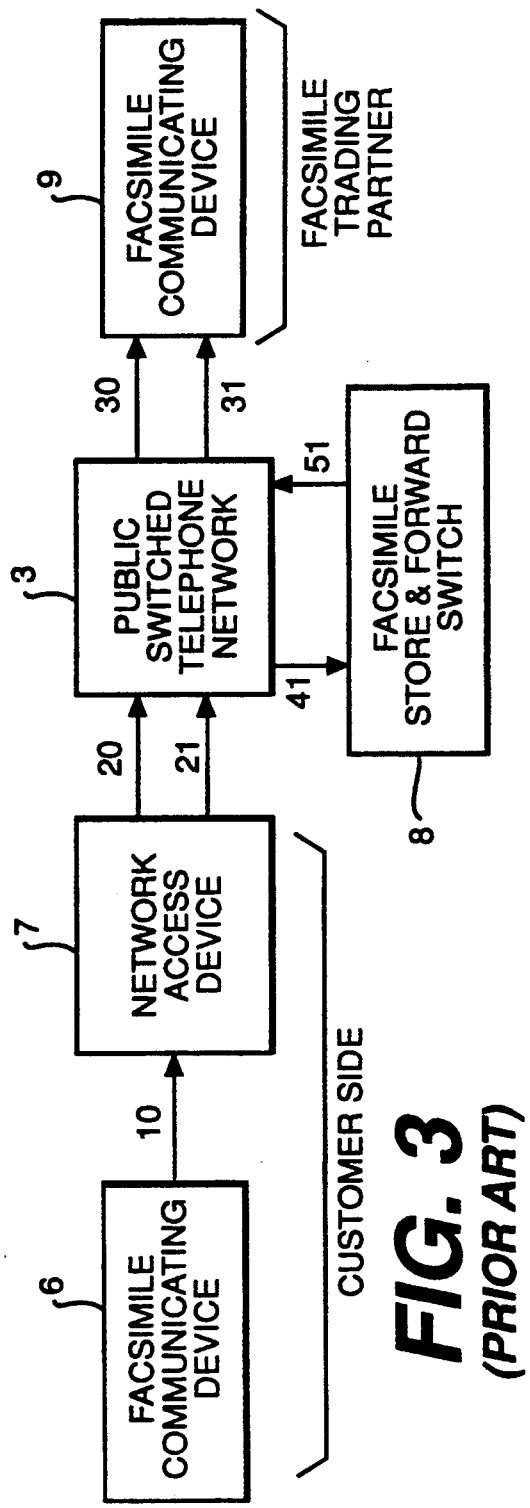
FIG. 3 *(PRIOR ART)*
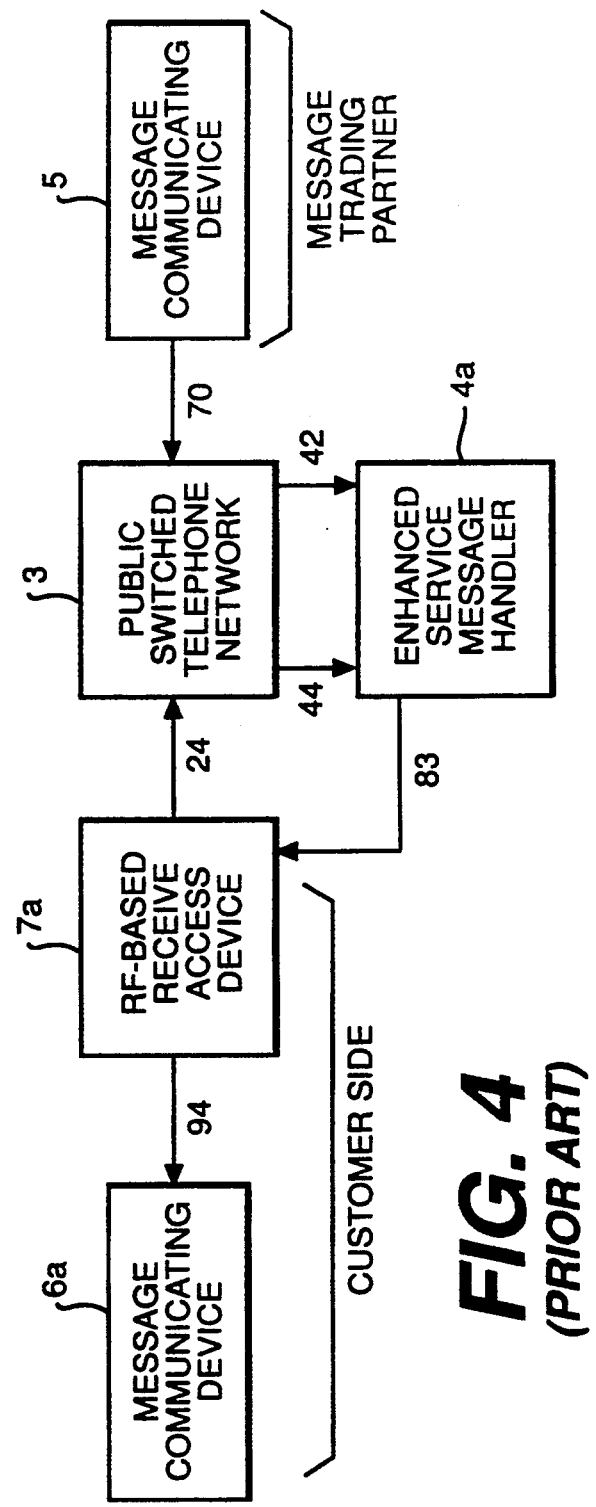
FIG. 4 *(PRIOR ART)*

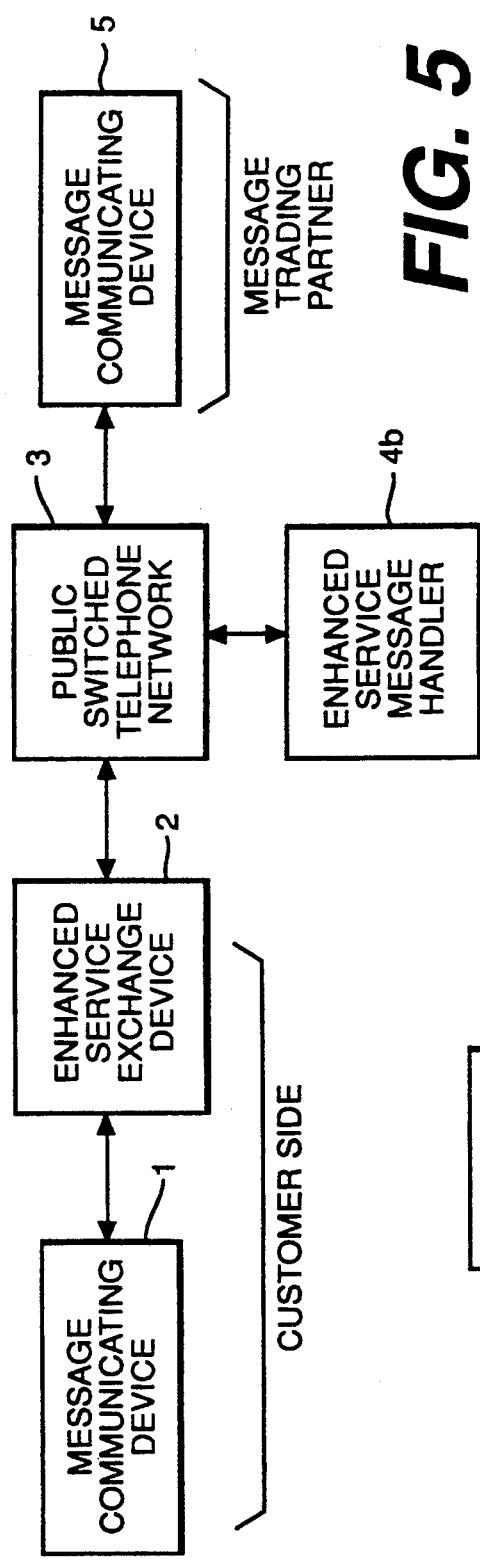
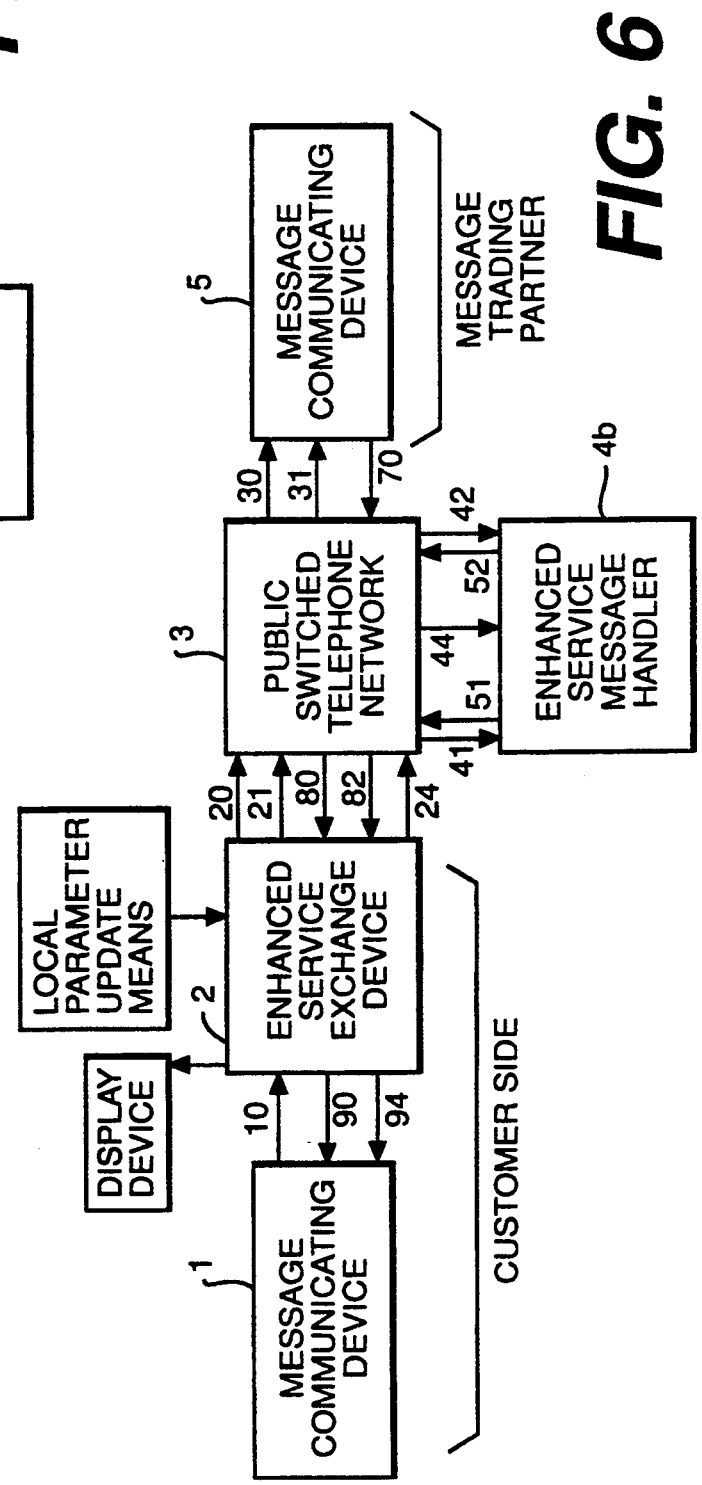

METHOD AND APPARATUS FOR SECONDARY-OPTION MESSAGE DELIVERY THROUGH ENHANCED SERVICE MESSAGE HANDLERS

BACKGROUND

1. Field of the Invention

The present invention relates to the transmission and reception of data originating from, and received by, data transmission machines.

2. Background of the Invention

FIG. 1 illustrates a first prior art point-to-point delivery system for digitally encoded message (DEM) data. In such a system, a message communicating device (MCD) 1 can deliver DEM data to another MCD 5. MCD 1 first enables connection 10 between MCD 1 and a public-switched telephone network (PSTN) 3. PSTN 3 then enables connection 30 between PSTN 3 and MCD 5, creating a point-to-point connection between MCD 1 and MCD 5, through PSTN 3. In the opposite direction, MCD 5 transmits DEM data to MCD 1 by activating connections 70 and 90.

The arrows in FIGS. 1–4 and in FIG. 6 point in the direction of the initial contact from the initiator of a connection to the respondent.

FIG. 2 illustrates a second prior art system, which uses an intermediate enhanced service message handler (ESMH) 4. This system requires two point-to-point connections instead of the single point-to-point connection required for the first prior art system. ESMH 4 can provide send-side service (store-and-forward functionality), receive-side service (mailbox functionality), or both, to its customer, the user of MCD 1. To send DEM data to MCD 5, MCD 1 first activates connection 10, connecting MCD 1 to PSTN 3. PSTN 3 then activates connection 41 to ESMH 4. The DEM data is then transferred from MCD 1 to ESMH 4, and stored. Connections 10 and 41 can then be broken off. ESMH 4 then forwards the DEM data through PSTN 3 to MCD 5, using connections 51 and 31.

When MCD 5 sends DEM data to MCD 1, ESMH 4 provides receive-side service for its customer, the user of MCD 1. MCD 5 transmits the DEM data to ESMH 4 through connections 70 and 42. ESMH 4 then stores the DEM data, until the data is picked up by MCD 1. MCD 1 initiates pickup through connection 13 to PSTN 3, and through connection 43 between PSTN 3 and ESMH 4. Once pickup is initiated, a copy of the DEM data is transmitted from ESMH 4 to MCD 1, using connections 43 and 13. U.S. Pat. No. 4,922,348 discloses a similar ESMH facsimile transmission system.

The send-side functionality of the apparatus illustrated in FIG. 2 forces the customer to choose between (1) always sending DEM data to the ESMH 4 for retransmission, and (2) having to make a choice between using a direct point-to-point delivery, as illustrated in FIG. 1, and using ESMH 4. Option (1) imposes unnecessary costs when a point-to-point delivery is available. Option (2) requires the customer to make a specific decision each time the system is used. For example, the customer may decide to use ESMH 4 because she has good reason to believe that a direct connection will fail, or because she needs to use a "value-added" feature of ESMH 4, such as deferred delivery. Moreover, the way that MCD 1 is used will differ depending upon whether the customer chooses point-to-point delivery or delivery through ESMH 4. This is a disadvantage to the customer, who has to learn two procedures, and know which one to use for each particular circumstance.

The receive-side functionality of the system illustrated in FIG. 2 also results in costs and delays. The customer cannot determine when DEM data is available for pickup without periodically calling back to ESMH 4 through MCD 1. These calls represent an unnecessary cost when there is no DEM data queued for pickup. Furthermore, unless ESMH 4 is monitored continually, there is an inevitable delay between the time the data is ready to be picked up, and the time it is actually picked up.

FIG. 3 illustrates a third prior art system, which is specific to facsimile store-and-forward networks. The third prior art system uses a network access device (NAD) 7 to improve the system illustrated in FIG. 2. NAD 7 makes routing decisions on behalf of the end-user of the facsimile communicating device (FCD) 6, using an address-based algorithm. After the user inputs the destination address at the user interface for FCD 6, NAD 7 decides either to attempt point-to-point delivery via connections 21 and 30, or to re-route the transmission through facsimile store-and forward switch (FSFS) 8, using connections 21 and 41. In the latter case, FSFS 8 performs normal store-and-forward processing as described above in connection with ESMH 4 in FIG. 2, and makes final delivery to FCD 9 through connections 51 and 31. U.S. Pat. No. 5,014,300 discloses a facsimile store and forward network based upon a network access device.

However, the use of an address-based algorithm for routing determination assumes that the end-user's routing decisions are based entirely on the cost of the transmission. The algorithm is designed to implement delivery through FSFS 8 whenever a transmission cost advantage is identified. For example, the algorithm may simply distinguish a local from a long-distance address, and route through FSFS 8 when it encounters the latter. This type of cost-based routing is becoming obsolete due to the considerable drop in the cost of long-distance direct dialing.

The more efficient use of telephone lines, discussed below, has become the more salient factor in send-side routing decision making. As a result of this shift, demand for ESMH systems, e.g., electronic mail and electronic data interchange (EDI), that avoid long distance charges by offering local point-of-presence dial-up for users, has not met expectations. Other ESMH systems that historically attempted direct, point-to-point connection first, e.g., voice mail and enhanced fax services, are experiencing slow growth.

FIG. 4 illustrates a fourth prior art system which improves receive-side, mailbox functionality by using a receive access device (RAD) 7a. RAD 7a is equipped with a radio-frequency (RF) receiver, to facilitate notification of delivery and automatic retrieval for DEM data received by the ESMH. MCD 5 establishes a send path to ESMH 4a through connection 70, PSTN 3, and connection 42. MCD 5 then transmits the DEM data to ESMH 4a, and severs the connection. ESMH 4a initiates RF transmission processing along path 83, to notify RAD 7a that DEM data is available for pickup. RAD 7a responds by creating connection 24 to PSTN 3, completing the path through connection 44 to ESMH 4a. As ESMH 4a queues the relevant DEM data for transmission, RAD 7a rings back to MCD 6a to provide a point-to-point connection between ESMH 4a and MCD 6a.

ESMH 4a then transmits the DEM data sent by MCD 5 to MCD 6a over connections 44, 24, and 94. U.S. Pat. Nos. 4,942,599 and 4,969,184 disclose RF notification systems similar to the system illustrated in FIG. 4.

This type of RF notification system is limited to MCD users within, typically, a 50-mile radius of an RF transmitter. Within the covered area, signaling difficulties are common. In city areas, for example, tall buildings create "caverns" that hinder the reliable delivery of RF signals. Furthermore, because the commercial costs of two-way RF-based transmission are prohibitive, it is possible only to send notification, and impossible to verify its receipt. Even the cost of one-way RF-based notification might prove prohibitive. Finally, the system illustrated in FIG. 4 cannot handle all formats of DEM data transmissions. It is limited to DEM data transmission formats using send and receive protocols that allow either a "sender" or a "receiver" of data to, interchangeably, assume an initiating role. For example, note that RAD 7a had to initiate a calling sequence, or protocol, to both MCD 6a and ESMH 4a in order to create an end-to-end connection between them. Both MCD 6a and ESMH 4a responded to RAD 7a by assuming receive postures. In this situation, unless the data transfer protocols for the particular format of DEM data waiting to be delivered are set up to allow a "receiver" to initiate data transmission, ESMH 4a will never be prompted to send data to MCD 6a. For similar reasons, the system illustrated in FIG. 3 would be incapable of handling formats of DEM data other than the specific formats and associated protocols for which it was designed.

For send-side functionality, phone-line availability is replacing cost as the critical consideration for routing of DEM data. The percentage of busy signals and no-answer situations encountered by MCDs has increased considerably over the last few years. The incidence of non-completed calls for facsimile communications is particularly high, and is estimated to be four to five times that of normal, voice-based communications. The diminishing importance of cost of delivery is associated with an increasing user preference for routing sequences that attempt point-to-point transmission as a first option. A backup store-and-forward function should be available as a second option without requiring the user to re-enter the addressing information.

Similarly, for receive-side functionality, users want their local PSTN to attempt a direct connection to their phone line first. If the phone line is unavailable, a backup mailbox should initiate an automated procedure to transmit the intercepted DEM data to the receiving MCD as soon as a phone line becomes available.

Typical users in a business environment want their MCD(s) and phone line(s) to be in use whenever they are available. Typical users in home-centered work environments must increasingly rely on DEM data storage and routing solutions. Such users only have one or two telephone lines available. Because those lines are often used for other communications, they are often not available for direct point-to-point delivery of DEM data.

SUMMARY OF THE INVENTION

The present invention is a system that facilitates the efficient transfer of DEM data, and has improved functionality on both the sending and receiving sides of the system. It is a system for establishing connections between communication devices such that the most direct available route is used, and such that the time needed for data transfer is minimized.

The present invention is illustrated in FIG. 5. FIG. 5 shows MCD 1 in communication with an enhanced service exchange device (ESX) 2. ESX 2 is in communication with PSTN 3, which is itself in communication with ESMH 4b and MCD 5. ESX 2 replaces NAD 7 and RAD 7a of the third and fourth prior art systems, respectively. ESMH 4b replaces FSFS 8 and ESMH 4a of the third and fourth prior art systems, respectively.

The description herein is written in terms of a "public-switched telephone network" or PSTN. However, the present invention is not limited to the network of local telephone systems and long-distance trunk carriers, but may be used with any appropriate type of public or private message transmission network. Furthermore, the terms "telephone" and "telephony" are not limited to devices and protocols that only work with the network of local telephone and long-distance trunk carriers. The present invention applies equally well to any switching network that allows analog or digital transmission between MCDs. Examples of such other systems include private networks, cellular networks, local area networks, wide-area data networks, private land-based networks, and any combination thereof.

FIG. 6 illustrates the flow of DEM data transmission in the present invention. Two paths connecting MCD 1 to MCD 5 are available for all attempted transmissions. On the sending side, the first option is the point-to-point path, defined by connections 10, 20 and 30. The second option uses the path defined by connections 10, 21, 41, 51 and 31 to deliver the DEM data to MCD 5. In the present invention, the point-to-point path is attempted first. ESX 2 monitors, through path 20, the success or failure of the attempted connections. If the connections are successfully completed, ESX 2 becomes a passive element in the point-to-point path. However, when ESX 2 identifies a failure in the first option path, it automatically, without user intervention, re-routes the DEM data through ESMH 4b.

On the receive-side, two paths are also available to connect MCD 5 to MCD 1. The first option is the point-to-point path defined by connections 70, 80 and 90, via PSTN 3 and ESX 2. The second option is followed if, after connection 70 is made, PSTN 3 attempts connection 80 and determines that ESX 2 is unavailable (using standard telephone signaling). When ESX 2 is not available (thus indicating the non-availability of MCD 1), PSTN 3 re-routes the connection from path 80 to path 42, and the DEM data is transmitted from MCD 5 to ESMH 4b.

Completion of the second option path, for final delivery to MCD 1 by ESMH 4b, may now take one of two alternative routes, depending on the configuration of ESMH 4b. ESMH 4b may be configured to attempt direct delivery through the path identified by connections 52, 82 and 90. For ease of discussion, this will be termed "second-option path A." If second-option path A is available, ESX 2 becomes a passive element of the connection and point-to-point transfer is accomplished.

Alternatively, ESMH 4b is configured to attempt a telephone-based notification to ESX 2 that DEM data is available. This will be termed "second-option path B." For path B, as for path A, connections 52 and 82 are still activated, but their purpose in path B is to notify ESX 2, not to provide a point-to-point connection to MCD 1. ESX 2 is thus disposed to recognize incoming notification of DEM data availability. After the notification is transmitted from ESMH 4b to ESX 2, ESMH 4b and ESX 2 exchange enough information to confirm that ESX 2 knows that it has DEM data waiting to be picked up, and the connection is severed.

After notification, ESX 2 initiates a DEM data pickup procedure through the path defined by connections 24, 44 and 94. Note that ESX 2 is disposed to provide the initiating protocol sequence to either ESMH 4b or MCD 1, so that ESMH 4b will be properly identified as the sender of DEM data and MCD 1 will be properly identified as the receiver.

A potential inefficiency is built into second-option paths A and B because PSTN 3 is disposed to treat ESMH 4b just like any other sender to MCD 1. In that case, when path 82 is unavailable, PSTN 3 would respond by re-routing the connection from path 82 to path 42. Then ESMH 4b would be making an end-to-end connection back to itself, instead of transmitting the DEM data to MCD 1. This is referred to as a loop-back situation.

This inefficiency is circumvented in the present invention by the disposition of ESX 2, the transmission logic of the sending port on ESMH 4b that initiates connection 52, and the logic of the receiving port on ESMH 4b for connection 42. First, ESX 2 is disposed to answer and attempt to complete connection 82, within a pre-specified time interval X if a direct line to MCD 1 is available. Second, the receiving port on ESMH 4b is disposed to answer, i.e., attempt to complete connection 42, only after a pre-specified delay Z, where Z is significantly longer than X. Finally, the sending port for connection 52 on ESMH 4b is disposed to terminate the attempted connection 52 if connection 82 is not established within time interval Y, where Y is significantly longer than X but significantly shorter than Z. Time intervals X, Y and Z are all measured from the time a call is initiated by connection 52 to connection 82. Thus, if the ESX 2 does not answer (and establish connection 82) within X time interval, it also will not answer later, after Y time interval, because a direct connection to MCD 1 is unavailable. Connection 52 is then dropped after Y time interval, but before delay Z has elapsed, preventing PSTN 3 from rerouting the call to connection 42. If the ESX 2 does answer within X time interval, MCD 1 is available, a path is established by connections 52, 82, and 90, and ESMH 4b transmits data over that path to MCD 1. No end-to-end connections are thus completed without leading directly to the transmission of the DEM data from ESMH 4b to MCD 1.

Other telephone-based notification and delivery options are supported as well. First, where available, ESMH 4b may request placement of a message waiting indication (MWI) signal on the line to ESX 2. ESX 2 would be disposed to check for an MWI signal immediately after completing any communication. Connection 82 in FIG. 6 is a line carrying the MWI signal from PSTN 3 to ESX 2.

Second, when ESMH 4b has a port capable of either notification, data transfer, or both, ESMH 4b may request PSTN 3 to establish a connection between ESX 2 and ESMH 4b as soon as a connection can be made to ESX 2. This is known as automatic callback. PSTN 3 monitors ESX 2 to determine when ESX 2 is ready to receive incoming connections. When it determines that ESX 2 is ready, PSTN 3 re-establishes a connection back to ESMH 4b and establishes a connection forward to ESX 2.

Third, in some regions a party may contract with its PSTN for automatic number identification (ANI) of a calling party. In such regions, ESMH 4b and ESX 2 may take advantage of ANI for notification purposes. If the ANI-identified caller is ESMH 4b, ESX 2 may consider that identification as its notification. ESX 2 therefore would not be required to answer quickly, and may not answer at all. However, note that ESMH 4b's verification that ESX 2 recognized its notification is lost if ESX 2 does not answer. ESMH 4b can confirm that the data has been transferred by checking that the data is no longer available for transfer at a later time. If the data is no longer available, then it must have been transferred. However, if the data is still available for transfer, it was not transferred, and another notification attempt must be made.

Furthermore, the existence of ANI may change the sequence of ESX 2's responses. For example, if ESX 2 were to identify the caller as ESMH 4b, it could immediately prepare to receive a data transfer.

ESX 2 may also inform the user of MCD 1 of the status of incoming messages via, for example, a status-of-processing display attached to MCD 1. Absent such a device, the user would be unaware that ESX 2 was used to transfer DEM data. The routing of DEM data through an intermediate stage introduces—at the very least—a time delay in message delivery on the sending side. Also, the use of ESX 2 in receiving and responding to notifications ties up the telephone line in a manner unknown to a potential DEM data sender. Thus it is advantageous to provide a device that informs the end-user of the processing steps taken by ESX 2.

Thus the invention described herein solves the problems identified above while providing the most efficient use of MCD 1 and its associated telephone line. The disposition of ESX 2, PSTN 3, and ESMH 4b is such that (1) DEM data routing decisions are based on the success and failure of first-option transmission attempts; (2) second-option paths are invoked automatically without user intervention, and only if necessary; (3) a reliable, cost-effective notification and/or mailbox-to-end-user delivery scheme is provided over telephone lines, so that all end-users may take advantage of mailbox services; (4) the system is not limited by the transfer protocols of the DEM data formats that are transmitted; and (5) loop-back connections are avoided.

A final aspect of this invention, discussed in greater detail below, is the method by which the disposition of ESX 2 and ESMH 4b can be dynamically altered to meet the specific communication needs of both the end-user of MCD 1 and the service provider of ESMH 4b.

The object of the present invention, therefore, is to facilitate the most efficient use of an MCD, in combination with an intermediate ESMH, such that DEM data transfer to and from the MCD is accomplished with the least possible delay and by the most direct route. The present invention differs from the prior art described above because (1) it uses two-way transfer; (2) it focuses on efficient routing rather than on cost reduction; (3) it allows the end-user, the ESMH, or both, to communicate for reasons other than to establish alternate path deliveries; and (4) the protocol for transmission of operational parameters allows maximum flexibility for end-user usage.

BRIEF DESCRIPTION OF THE DRAWINGS

FIG. 3 is a block diagram illustrating a prior art system which uses a network access device.

FIG. 4 is a block diagram illustrating a prior art system which uses a radio-frequency receiver.

FIG. 5 is a block diagram illustrating the use of an enhanced service exchange device in the present invention.

FIG. 6 is a block diagram illustrating the connections required for the present invention.

DETAILED DESCRIPTION OF A PREFERRED EMBODIMENT OF THE INVENTION

1. Sending Side

Figure 1:
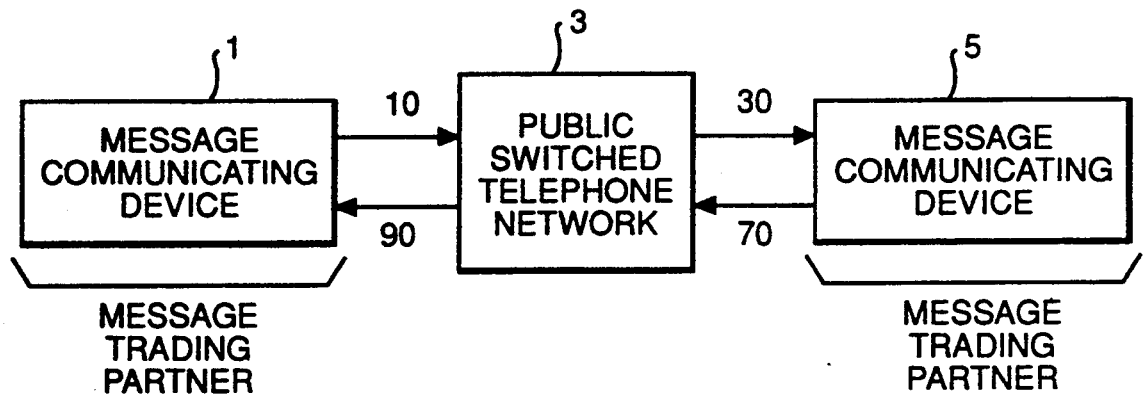
FIG. 1 is a block diagram illustrating a prior art point-to-point delivery system.
Figure 2:
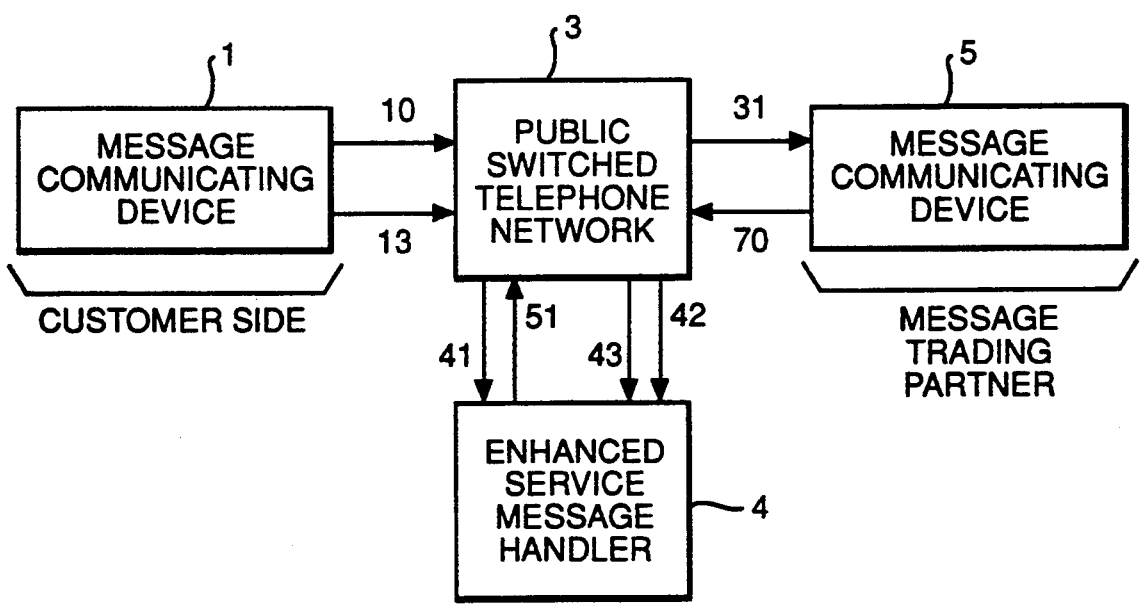
FIG. 2 is a block diagram illustrating a prior art system including an intermediate enhanced service message handler.
Figure 7:
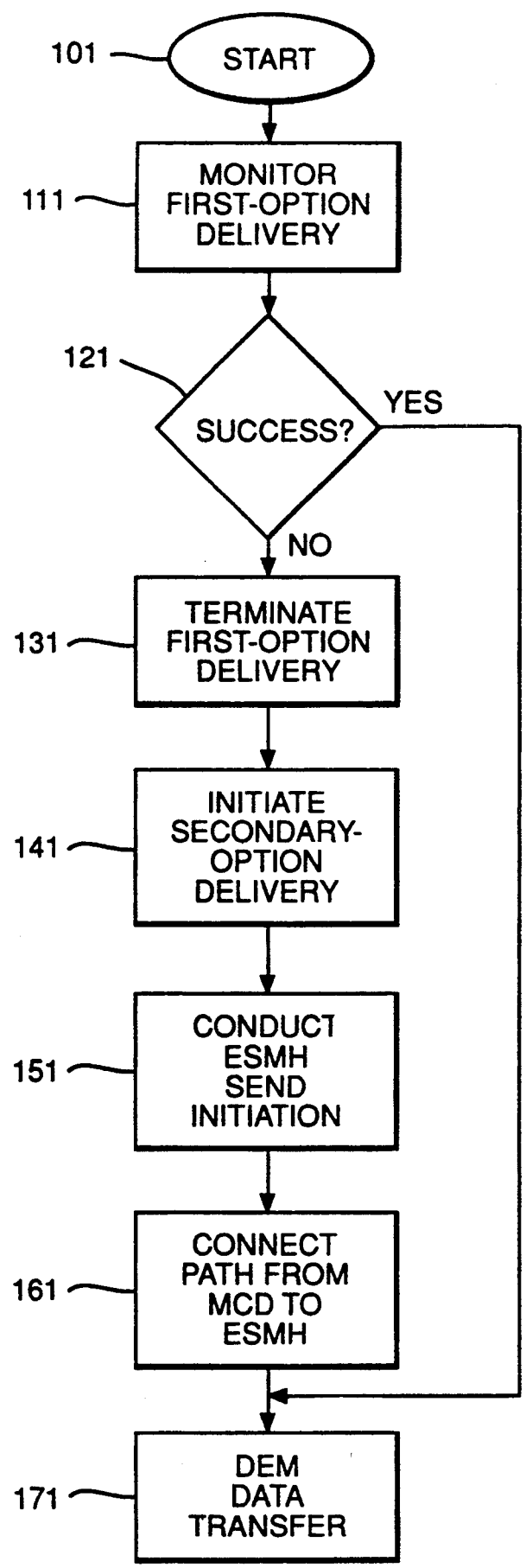
FIG. 7 is a flowchart representing the logic used on the sending side by the enhanced service exchange device.

FIG. 7 shows a flow chart representing the logic used on the sending side by an enhanced service exchange device disposed for first- and secondary-option delivery of DEM data from a customer using an MCD.

Initial State: In start condition 101 in FIG. 7, ESX 2 is disposed for sending and receiving DEM data. In this state, ESX 2 is prepared for incoming connections via path 80 in FIG. 6, and outgoing requests for connections from MCD 1 via connection 10.

Point-to-Point Communication: When ESX 2 receives a request for a connection (also known as an off-hook appearance) from MCD 1 (via connection 10), it automatically attempts to connect to PSTN 3 via connection 20. ESX 2 monitors the success of the first-option delivery along this path, as indicated by task 111 in FIG. 7. As part of this monitoring, ESX 2 collects the digits entered as addressing information to PSTN 3.

Note that ESX 2 may also be disposed to recognize Dual Tone Multi-Frequency (DTMF) escape sequences preceding the address. Upon recognizing a specific escape sequence, ESX 2 terminates path 20 according to the function specified by the escape sequence, e.g., immediate turn to secondary-option delivery or local parameter updating by the end-user (discussed below).

As ESX 2 performs monitoring task 111, it determines if the connection along the path identified by connections 10, 20 and 30 has succeeded, as shown by task 121. If it detects success, it passively allows DEM data transfer task 171 between MCD 1 and MCD 5.

ESMH Communication: If it detects failure, it terminates connection 20 by sending an on-hook signal to PSTN 3 long enough to assure disconnection, as shown by task 131. ESX 2 then initiates the secondary-option delivery path beginning with connection 21 by directing PSTN 3 to provide connection 41 to ESMH 4b, as shown by task 141. Upon achieving end-to-end connection between ESX 2 and ESMH 4b, ESX 2 identifies itself, its intended action (to send DEM data), and the DTMF tones that were monitored during task 111, as shown by task 151. Note that the DTMF tones typically represent the addressing information used for the first-option delivery attempt, but as noted in the previous paragraph, could represent any data content when an escape sequence precedes them.

The act of re-routing a message may also require a change in the address. For example, private telephone networks are often configured to allow dialing long-distance numbers using, e.g., 7-digit instead of 10-digit numbers. When the private-network path is not available, either ESX 2 or ESMH 4b may have to modify the address in order to use PSTN 3 for re-routing the delivery.

Data Transfer: Upon successfully completing task 151 with ESMH 4b, ESX 2 re-establishes the path back to MCD 1 as shown by task 161, and then transfers DEM data from MCD 1 to ESMH 4b, as shown by task 171. After completion of task 171, the connection is terminated according to the DEM data transfer protocol, and ESMH 4b is charged with delivery of the DEM data to MCD 5, using normal point-to-point transfer along the path identified by connections 51 and 31 in FIG. 6.

2. Receiving Side

Figure 8:
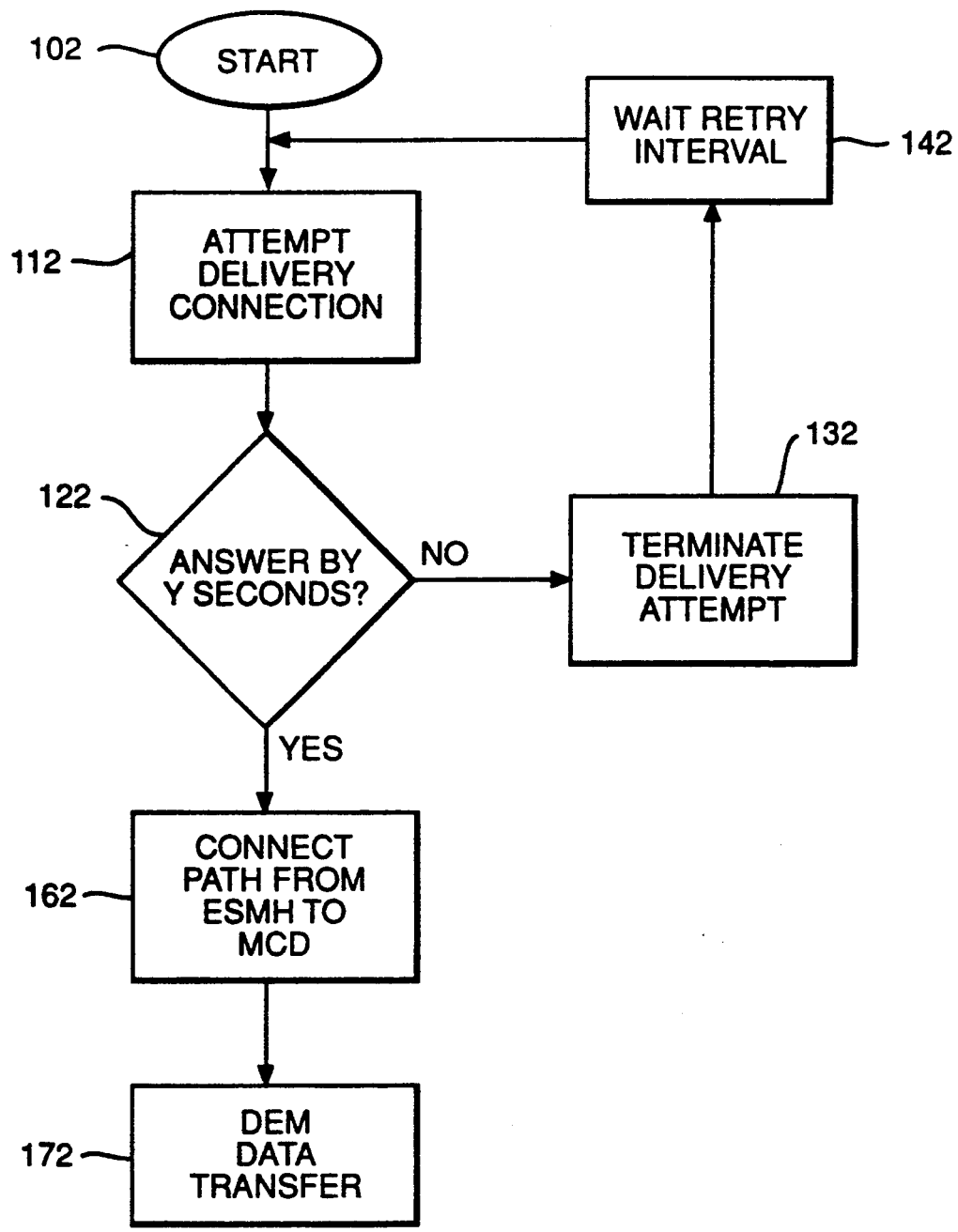
FIG. 8 is a flowchart representing the logic used by the enhanced service message handler.

FIG. 8 is a flow chart representing the logic used by an enhanced service message handler disposed for the second part of secondary-option delivery of DEM data to a customer using an MCD, when the choice of ESMH 4b is to attempt direct delivery to MCD 1 (see FIG. 6). MCD 5 has attempted a point-to-point connection MCD 1 via the path identified by connections 70, 80 and 90. This path has proved to be unavailable, in that the connection between PSTN 3 and ESX 2 along path 80 cannot be established. PSTN 3 has accomplished the first part of the secondary-option path available, to ESMH 4b, through connections 70 and 42, and the DEM data has been transmitted from MCD 5 to ESMH 4b.

Initial State: In start condition 102, ESMH 4b is ready to initiate a delivery attempt to MCD 1 along the path identified by connections 52, 80 and 90. Note that the relationship between ESMH 4b and MCD 1 is most likely no different from that between MCD 5 and MCD 1. That is, ESMH 4b is simply another sender of DEM data insofar as MCD 1 is concerned. Note, however, that ESMH 4b may be disposed as an enhanced service provider in such a way that the DEM data transfer itself is "enhanced". While such enhancements are outside the scope of the present invention, it is relevant to the design and operation of ESX 2 that it be disposed to allow such enhanced functionality without interruption.

Data Delivery Option: ESMH 4b then attempts to connect directly to MCD 1, as shown by task 112. As stated above, inasmuch as PSTN 3 is disposed to re-route the attempted connection along path 41, back to another port on ESMH 4b, it is critical that, if path 80 is available, it be known immediately by ESMH 4b (task 122). If it is not available, ESMH 4b terminates connection 52, as shown by task 132, and follows its retry procedures for continued delivery attempts, as shown by task 142.

It is important to note that the availability of MCD 1 is equivalent to the availability of ESX 2, since both share the same telephone line. The availability of the telephone line can thus be determined very quickly, but only if the line is answered very quickly. Since the time interval for when MCD 1 answers an inbound connection cannot be controlled in all environments, ESX 2 provides the necessary action by being disposed to answer within X seconds. Conversely, the receiving ports on ESMH 4b are controlled to answer after a time interval of at least Z seconds, where Z is significantly longer than X. Note that the physical non-availability of MCD 1 while the telephone line is available is not addressed by the present invention.

Finally, the sending port on ESMH 4b that is performing the logical steps identified in FIG. 8 is programmed to determine if an answer is detected within Y seconds, where Y is significantly longer than X, and significantly shorter than Z, and to terminate the connection when the Y time interval has elapsed without answer. With this logic as shown by decision point 122 in FIG. 8, ESMH 4b will not incur the costs that would be associated with a path created by PSTN 3 along the connections 52 and 42. Further, given an appropriately short retry interval specified in task 132, ESMH 4b can generally achieve successful connection (within Y seconds) to ESX 2 at the earliest possible moment that the telephone line is available.

Typical values for X range from 2 to 3.5 seconds, for Y range from 4 to 5.5 seconds, and for Z range from 6 to 7 seconds.

Upon successful completion of task 112, such that an answer by ESX 2 is detected within Y seconds according to decision point 122, ESX 2 waits N seconds and then provides connection 91 back to MCD 1, and clears the path from ESMH 4b to MCD 1 for delivery of the DEM data. N is typically 2 seconds, but might be set as high as 4.5 seconds. The need for an N-second delay is discussed below. Also note that, in performing its part of task 162, ESX 2 must be capable of generating DTMF signals or digitally-encoded data to MCD 1, emulating the DEM data transfer initiation protocol, should the initiation protocol have been lost in the N-second gap between the answer and ringback to MCD 1.

Figure 9:
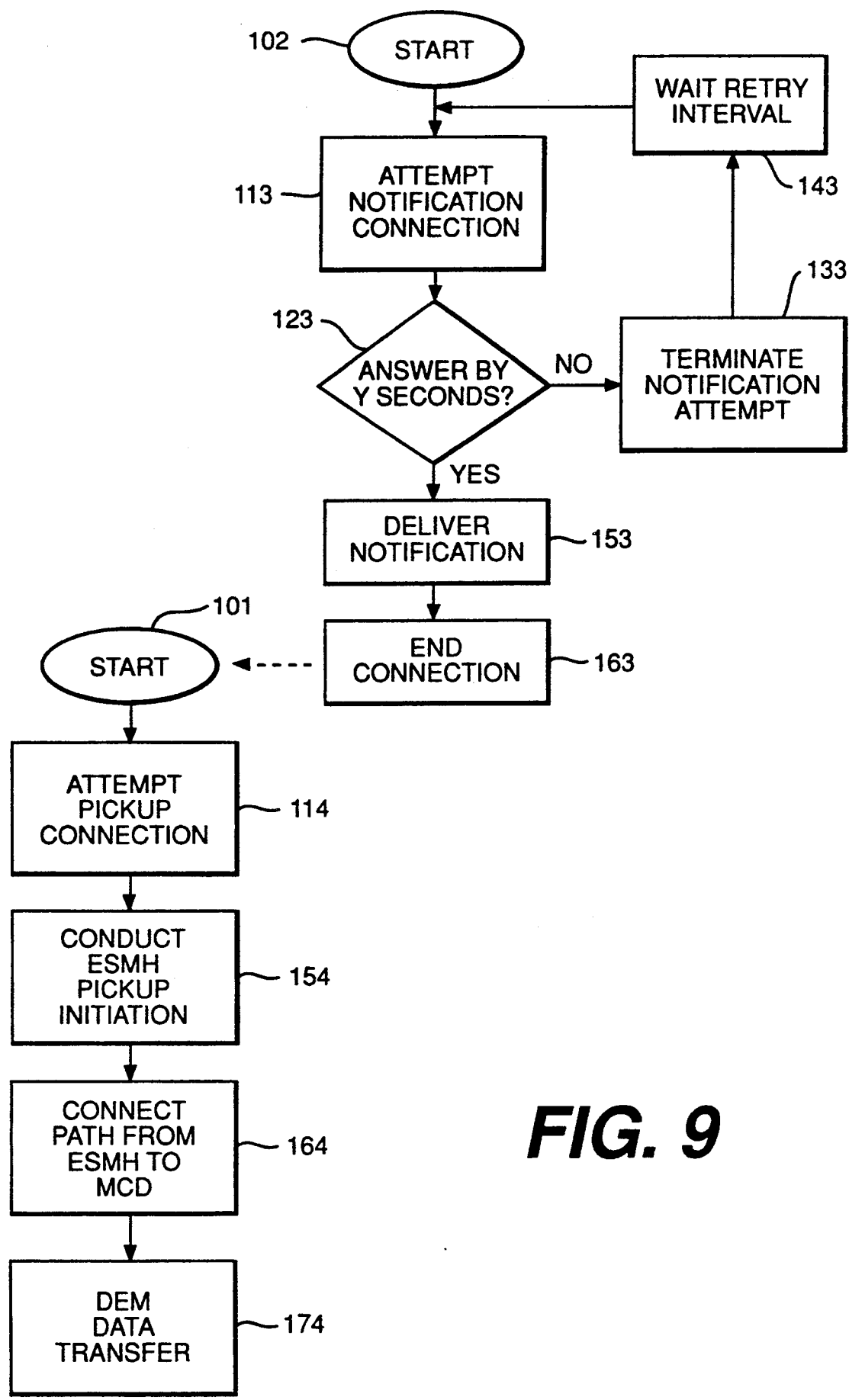
FIG. 9 is a flowchart representing the logic used by both an enhanced service message handler and an enhanced service exchange device.

Notification Option: FIG. 9 shows a flow chart representing the logic used by both an enhanced service message handler and an enhanced service exchange device, disposed for the second part of secondary-option delivery of DEM data to a customer using an MCD, when the choice of ESMH 4b is to notify ESX 2 of the availability of DEM data for retrieval by MCD 1. Again, the actions that have preceded this sequence were discussed above with reference to FIG. 8.

In this case, ESMH 4b begins in the same start condition 102 as indicated in FIG. 8, except that it is now disposed towards notification to ESX 2 of the availability of DEM data for retrieval, rather than for direct delivery of such DEM data. Further, the actions of ESMH 4b in performing steps 113, 123, 133 and 143 parallel those of steps 112, 122, 132 and 142 noted in FIG. 8. However, note that the processing requirements for delivery of DEM data are typically more demanding than the requirements for notification. The opportunity cost of failed connection attempts is greater for delivery than for notification, because the usage time wasted is the same, but delivery ports are generally more expensive than notification ports. Further, the time interval of the notification is substantially shorter than the duration of DEM data delivery. Since this method places the burden of initiating the call on the customer using MCD 1, ESMH 4b can off-load the cost of this component of its mailbox service onto this customer.

To return to the processing flow of FIG. 9, the assumption is now made that ESX 2 has answered within Y seconds. ESX 2 must wait for an N-second interval because the notification must be delivered to the ESX 2 without generating connection 90 back to MCD 1. The notification content may be DTMF signaling or digitally-encoded data transfer, depending on the disposition of ESX 2 in terms of the transfer protocol of MCD 1. However DTMF signaling is undoubtedly the least expensive and most expedient alternative. Upon the successful delivery of notification to ESX 2, as shown by task 153, the connection is ended by ESX 2, as shown by task 163.

Other notification schemes are available with more advanced telephone systems. If ESX 2 is disposed to expect MWI notification, it simply checks for such a condition on the line after performing any task whereby the telephone line was at least temporarily not available for receiving a call. In this case, task 113 is merely ESMH 4b's request to PSTN 3 to place the MWI signal on the telephone line terminated at ESX 2. The remaining steps are unnecessary.

The case where ESMH 4b is disposed to expect ANI identification by ESX 2 is even simpler. ANI identification represents the notification itself. In this case, ESMH 4b simply waits a predetermined time (less than Z, but long enough to assure that the ANI information was received) and then drops the attempt. It then checks against its message data base after time interval M to see if the same DEM data has not yet been retrieved (and is not in the process of being retrieved). If ESMH 4b can determine that no retrieval attempt has been made in the time interval M (typically 1 to 5 minutes), it retries its "notification."

ESX 2 now takes the initiating role in picking up the DEM data. ESX 2 returns to start condition 101 long enough to assure disconnection from PSTN 3, and then initiates a pickup connection, along the path identified by connections 24 and 44 in FIG. 6, as shown by task 114. Upon successful completion of this task, ESX 2 identifies itself and its intended action (to pickup DEM data), as shown by task 154. Upon successfully completing task 154 with ESMH 4b, ESX 2 establishes connection 94 back to MCD 1, shown as task 164. ESMH 4b then transfers DEM data to MCD 1, shown as task 174. After the completion of task 174, the connection is terminated according to the DEM data transfer protocol.

As noted above, when ESX 2 is initiating connections to both ESMH 4b and MCD 1 (along connections 24 and 54 for ESMH 4b and connection 94 for MCD 1), it is possible for both ESMH 4b and MCD 1 to perceive themselves to be in the responder role. If it is necessary for ESX 2 to create the condition whereby ESMH 4b perceives itself to be the initiator (the most likely case since it is storing the DEM data for delivery to MCD 1), this is accomplished as part of task 154. On the other hand, if ESX 2 must create the opposite condition, such that MCD 1 perceives itself in the initiator role, ESX 2 does this through task 164 (after completing connection 94).

Note that this situation may also occur with systems having automatic callback. In those systems, PSTN 3 may initiate the connection paths to both sides. In this case, given that ESMH 4b made the request for automatic callback services to PSTN 3 in the initiator's role, ESMH 4b is best disposed to accept the initiator's role immediately upon recognizing the existence of the callback. Wherever automatic number identification (ANI) is available, ESX 2 may also be disposed to identify the caller as ESMH 4b, and then establish the connection to MCD 1 immediately upon connection with ESMH 4b.

3. Notification and Parameter Setting Protocol

FIG. 9 shows that ESMH 4b notifies ESX 2 that DEM data is available for retrieval and transmission to MCD 1. ESX 2 is disposed to wait N seconds. N is a variable parameter that is set on initial distribution of ESX 2 and can be updated by ESMH 4b at its discretion. ESMH 4b may also need to communicate with ESX 2 to perform administrative functions. Such functions typically involve a remote query of ESX 2 by ESMH 4b, such that ESX 2 apprises ESMH 4b of the contents of its variable processing parameters, and a remote updating of those variable processing parameters.

To accomplish these tasks, a protocol must be defined for communications between ESMH 4b and ESX 2. The parameters of this protocol are defined herein, and shown in short-hand notation in FIGS. 10, 10a and 10b.

Figure 10:
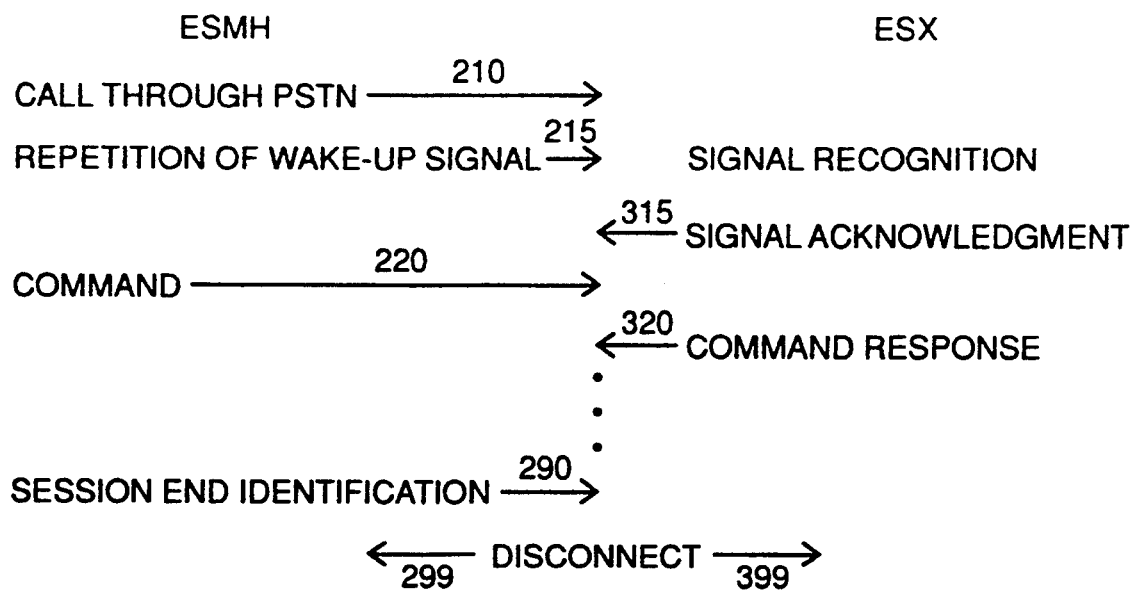
FIG. 10 is a representation of the communication protocol between the enhanced service message handler and the enhanced service exchange device.

Protocol Initiation: FIG. 10 shows the structure of the communication scheme from ESMH 4b to ESX 2. ESMH 4b places a call 210 through PSTN 3 using the address of the phone line terminating at ESX 2. After the call is placed, ESMH 4b should optimally begin a repetition of a sequence of telephony signals, identified as wake-up signal 215, such that when ESX 2 answers, it recognizes the wake-up signal as that of ESMH 4b.

There are two alternatives to this scheme. In the first alternative scheme, ESMH 4b waits a pre-determined period (approximately 4 seconds) without an audible ring progress tone being heard to be aware that ESX 2 had answered, and then sends its identification signal. In this case, ESX 2 would have to wait two complete ring cycles (since the caller's cycle is not the same as the receiver's) to be certain that the caller is not ESMH 4b. This wait is typically prohibitive for the proper conduct of the initiation protocol when the caller is not ESMH 4b. In the second alternative scheme, ESX 2 would generate a signal of its own upon answering, which would be recognized by ESMH 4b. However, in this case, it is a potential disruption to the initiation protocol if, again, the caller is not ESMH 4b. Thus the scheme described in the preceding paragraph with reference to FIG. 10, using a repetition of wake-up signal 215, is the scheme that is least likely to cause problems with the underlying DEM data protocol.

Upon recognizing the signal, ESX 2 provides acknowledgement 315 back to ESMH 4b. This initiates the two-way interactive acknowledgement protocol missing from non-telephone based notification methods. Note that other signals may be directed to MCD 1 which should not be treated as "false" wake-up signals. For this reason, a negative signal acknowledgement and renegotiation may in fact be detrimental.

General Command and Response: After signal acknowledgement, command 220 is then passed from ESMH 4b to ESX 2. ESX 2 responds with command response 320. An error-correction mechanism may now be provided, whereby command response 320 may be a negative acknowledgement. In such case, ESMH 4b is disposed to respond with repeat or replace command 220. A maximum number of consecutive negative acknowledgements suggests disconnection and either retry (assuming a bad telephone line) or manual intervention. Note also that timing parameters may be invoked such that either side may identify an elapsed time with no signal energy from the other side, though such signaling was anticipated. If ESX 2 perceives such time-out condition, it should treat it as an error (and thus respond with negative command response 320); if ESMH 4b perceives this condition, it should treat it as a negative command response from ESX 2 (and thus respond with repeat or replacement command 220).

There may be multiple command and (positive) command response pairings. When ESMH 4b has completed its intended actions, it may either proceed directly to disconnect 299 or perform an intermediary session end identification 290. The latter procedure provides an orderly means whereby ESX 2 can confirm the end of the communication session and proceed to disconnect 399 itself, rather than wait for a pre-determined period to indicate termination.

Figure 10A:
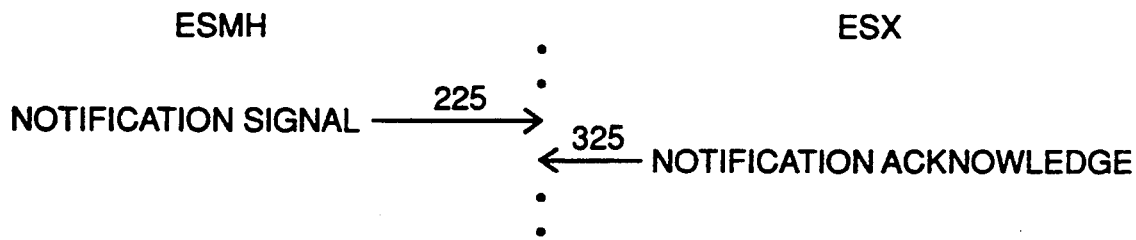
FIG. 10a is a representation of the protocol between the enhanced service message handler and the enhanced service exchange device for notification communications.

Notification Protocol: FIG. 10a shows the case where notification signal 225 is a specific use of general command 220, and notification acknowledgement 325 is a specific use of general command response 320. The absence of session end negotiation may be more justified in this case, inasmuch as it may be prearranged that the notification signal is the only command that may be presented. It would be entirely reasonable for both sides to proceed immediately to disconnect if they were disposed not to expect additional commands. However, note that in this case, ESX 2 would have to assume that its notification acknowledgement 325 was received by ESMH 4b. The inclusion of session end identification 290 in that protocol would provide unequivocal assurance at both sides.

Figure 10B:
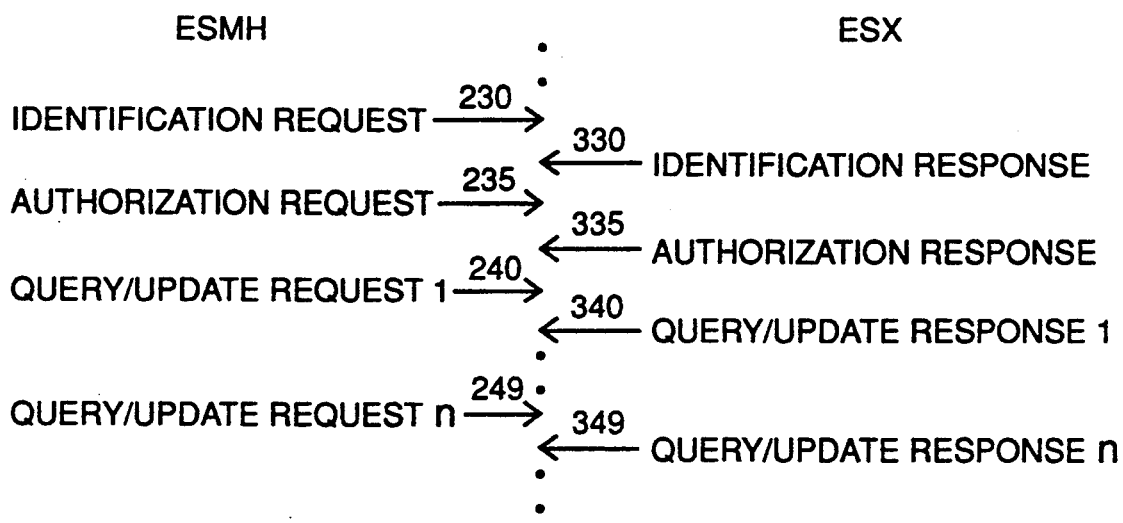
FIG. 10b is a representation of the protocol between the enhanced service message handler and the enhanced service exchange device when the intent of the enhanced service message handler is for remote access to the enhanced service exchange device.

Remote Query and Update Protocol: FIG. 10b shows the case where the intent of ESMH 4b is to have remote access to ESX 2, either for the purposes of query, updating, or both. The protocol is necessarily more complex in this case. Optional identification request 230 is both a remote access signal and the initiation of a security procedure to prevent unauthorized access. ESX 2 may be disposed to prevent either query or updating of its parameters, or both, without proper authorization of the source. In the protocol described in FIG. 10b, ESX 2 is disposed to wait for an authorization request 235 that it can verify as originating from ESMH 4b. One procedure that may be used for this step is for ESMH 4b to generate authorization request 235 that includes a "key value," based on the value provided in identification response 330. With ESX 2 using the same basis for calculating this key value, it can assess authorization request 235 for a match. Furthermore, ESX 2's identification may be modified after each authorized access, such that the authorization key value would change for the next attempted access. This provides advanced security, inasmuch as a non-authorized "listener" would have to determine the basis for generating the key value, as opposed to simply knowing the key value.

Given a validated key value, ESX 2 responds with authorization response 335, effectively allowing ESMH 4b control over the session. For multiple command and response pairings, the general case noted in FIG. 10 is replaced by specific query or update requests 240 through 249, with specific query or update responses 340 through 349, respectively, from ESX 2. Again, session end identification 290 is optional but strongly suggested prior to disconnect.

Local Parameter Setting: ESX 2 is disposed to provide the end-user of MCD 1 with the capability of updating some or all of its variable parameters locally. For example, the user might update the "prefix" that must be dialed (including any required pause) to connect to an outside line through a private branch exchange (PBX). ESX 2 may be updated by using a pre-defined escape sequence of DTMF tones in the first position(s), by using specific keystrokes through a keyboard interface or by using a serial communication interface with a pre-specified sequence of ASCII characters.

Another use of an escape sequence was described above in terms of send-side functionality. ESX 2 may respond to escape sequences either to initiate a connection through PSTN 3 or to invoke a local function. Therefore, ESX 2 should be disposed to respond to a variety of initiating escape sequences.

4. Component Processing

Figure 11:
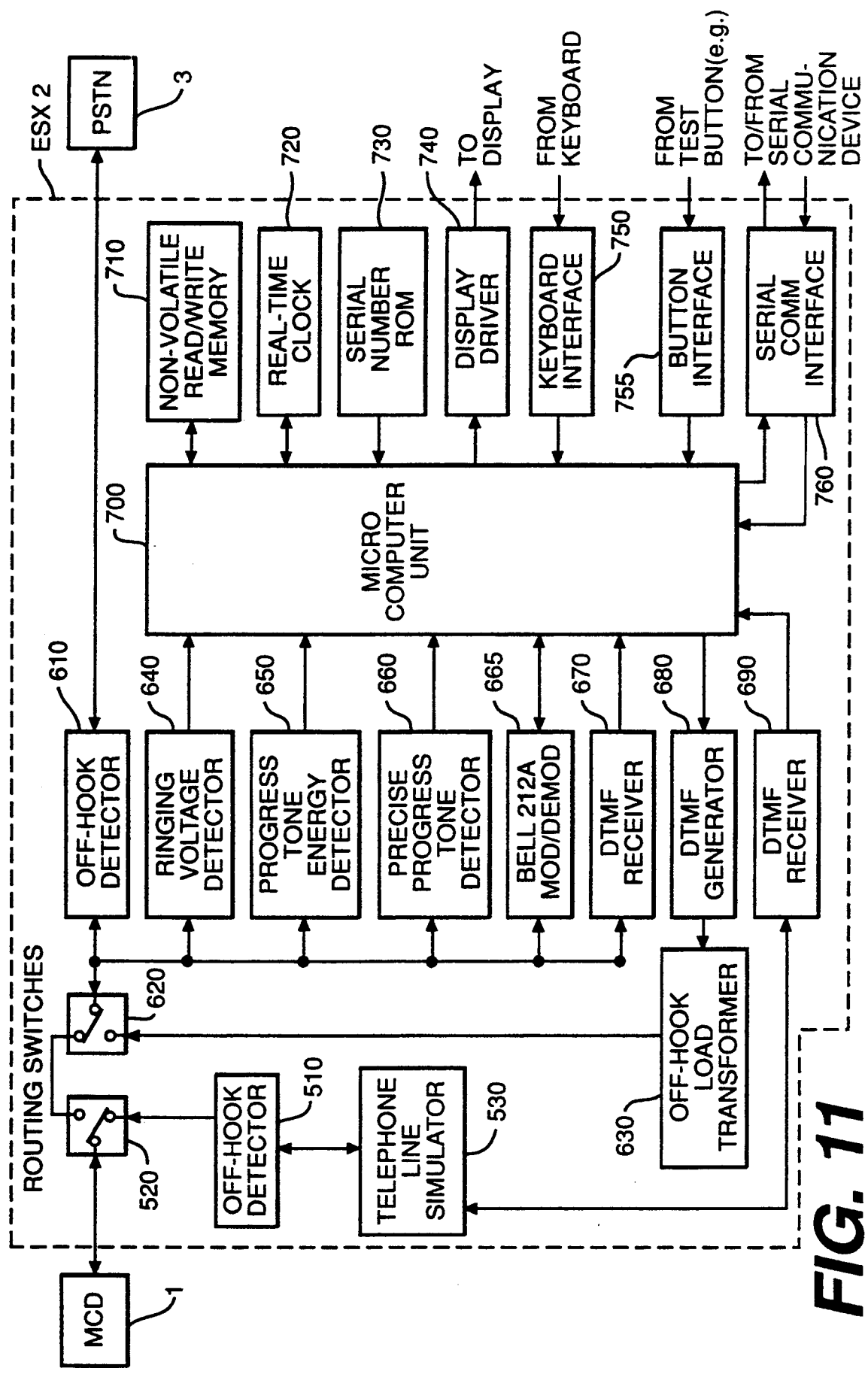
FIG. 11 is a schematic block diagram illustrating the enhanced service exchange device in its base condition.

FIG. 11 is a schematic representation of ESX 2 in its base-state condition. ESX 2 communicates on the left of FIG. 11 with MCD 1, and on the right with PSTN 3.

Base-State

In the base-state condition, off-hook detector 510 monitors the off-hook status of MCD 1, i.e., it monitors when MCD 1 requests a connection. Routing switch 520 and telephone line simulator 530 allow ESX 2 to present a telephony appearance to MCD 1, while preventing MCD 1 from receiving telephony signals from PSTN 3.

Off-hook detector 610 monitors the off-hook status of PSTN 3, and routing switch 620 is disposed to accept signals from PSTN 3.

ESX 2's proper disposition to process outgoing and incoming calls is verified upon initial installation, or periodically by the user of ESX 2. Button interface 755 is provided for this purpose. When the user presses a test button, the button initiates a sequence of tests, directed by microcomputer unit 700 (e.g., Motorola 6805), such that, if all are not properly disposed, ESX 2 will generate a message to display driver 740. Real-time clock 720 can be provided by, for example, Dallas Semiconductor's "Time-in-a-can" chip.

Outbound Call Processing

Sending-Side Initiation: Initiation of send-side functionality begins when ESX 2 detects the off-hook status of MCD 1. Routing switch 520 changes state and provides an off-hook appearance to PSTN 3, and a connection from MCD 1 to PSTN 3 is established. DTMF receiver 690 (e.g., Teltone M8880) monitors the DTMF digits passed from MCD 1 to PSTN 3. ESX 2 will then act according to the logic described above with reference to send-side functionality.

First-option monitoring: Unless escape processing is indicated, the connection path to PSTN 3 remains established. Progress tone energy detector 650 (this function can be provided e.g., by Motorola chip 6805, which also serves as micro-computer unit 700) and precise progress tone detector 660 (e.g., Teltone M982) are disposed to detect connection failure conditions under which micro-computer unit 700 will be disposed to re-route the connection path. Precise progress tone detector 660 is included to increase the speed, if possible, at which a failure condition, such as a busy line, may be detected. This speed of failure detection is critical to DEM data delivery protocols, such as facsimile protocols, that may begin a timer from the moment that the digits are passed by MCD 1, and have the potential to time-out if the protocol is not initiated with the receiving MCD within a pre-defined time period. Progress tone energy detector 650 is employed for detection of such failure conditions when precise progress tone detector 660 cannot make an unequivocal assessment of failure. Since this detector uses an energy versus time cadence detection method, it does introduce a time delay in recognition of failure conditions. However, it also provides a back-up measure of detection, and thus minimizes the number of times that a failure condition will not be recognized.

If no re-routing is necessary (i.e., point-to-point delivery is successful), off-hook detector 610 monitors the connection for on-hook status from PSTN 3, and then returns to base-state condition. Note that, if ESX 2 is disposed to expect MWI notification (see above), it will perform a notification check immediately after returning to base-state.

If re-routing is necessary, routing switch 520 is disposed to maintain the present state of MCD 1, as well as isolating it from PSTN 3. In addition to providing holding current, telephone line simulator 530 is disposed to provide a specific pacifier tone to MCD 1 while the connection is re-routed. Note that this provides an "audible display" mechanism to the end-user, showing that ESX 2 is in use and performing its functions in preparation for a re-routed delivery.

Alternative Path Routing: Secondary-option routing is then invoked. As routing switch 520 has disconnected MCD 1 from PSTN 3, PSTN 3's current connection is now broken, terminating the connection. After a pause to allow PSTN 3 to correctly detect the end of the first call, routing switch 620 now changes state, connecting off-hook load transformer 630 to PSTN 3 via off-hook detector 610. Micro-computer unit 700 instructs DTMF generator 680 (e.g., Teltone M8880) to generate the digits to PSTN 3 that represent the address of the secondary-option delivery route. Progress tone energy detector 650 and precise progress tone detector 660 are disposed to detect connection conditions with ESMH 4b. Upon successful connection, micro-computer unit 700 is disposed to conduct send-side protocol with ESMH 4b to prepare for send-side delivery. In the most likely case, this protocol is DTMF-based. Note, however, that serial communication interface 760 may be invoked (in a connection not noted in the figure) such that data-based protocols might be conducted. Finally, after such protocol has been completed, and the system is ready for DEM data transfer, routing switches 520 and 620 change state to create a connection between ESX 2 and ESMH 4b. DEM data is then transferred between MCD 1 and ESMH 4b. Off-hook detector 610 monitors the connection for on-hook status from PSTN 3 and MCD 1, and then returns to base-state condition. Note that, if ESX 2 is disposed to expect MWI notification, it will perform a notification check immediately after returning to base-state.

Escape Sequence Processing: Escape processing may be invoked for local updating of ESX 2 parameters in non-volatile read/write memory 710 of micro-computer unit 700, as discussed in the section on local parameter setting above. Alternatively, escape processing may be invoked for direct routing to a secondary-option delivery path (bypassing first-option delivery), or to another, pre-specified delivery end-point. In the first case, processing begins at the point where the connection is re-routed (see "alternative path routing" above). In the second case, the digits after the escape sequence represent a specific action code, rather than an address. These digits are analyzed and mapped to non-volatile read/write memory 710. Micro-computer unit 700 then identifies the required response. The response might typically require delivery processing similar to secondary-option delivery processing, but to a pre-specified end-point, rather than to an intermediary switching point. For the purposes of this discussion, however, component processing is equivalent to send-side functionality after a re-routing decision has been made (again, see "alternative path routing" above), except that it uses addressing information provided by ESX 2 rather than by MCD 1.

Thus, when the escape sequence leads to a direct connection along a path other than to an address identified in the DTMF digits passed, micro-computer unit 700 directs routing switch 520 and telephone line simulator 530 to keep the connection to MCD 1 active, while simultaneously instructing DTMF generator 680, off-hook load transformer 630 and routing switch 620 to initiate the direct delivery path. By performing both functions as soon as the escape sequence is identified, the connection is made as quickly as possible. Furthermore, the immediate use of the path prevents PSTN 3 from directing an inbound call to MCD 1, thus preventing collision of the connection to MCD 1.

Inbound Call Processing

Receiving-Side Initiation: Initiation of receiving-side and protocol functionality begins when ring voltage detector 640 detects ringing from PSTN 3. ESX 2 answers the call immediately, by using routing switch 620 to connect off-hook load transformer 630 to PSTN 3 by way of off-hook detector 610. Its initial state is to anticipate receiving a pre-defined telephony signal from ESMH 4b, indicating a request to initiate notification and parameter-setting protocol. If such a signal is not identified (by DTMF receiver 670 or Bell modem 665) within a pre-determined time interval, micro-computer unit 700 directs processing as if the intent of the call is a direct, point-to-point transfer to MCD 1. Note that in this sense, the originating "point" could be either MCD 5 or ESMH 4b.

Receive-Side Bypass: If the pre-defined wake-up signal is not detected by ESX 2, micro-computer unit 700 instructs telephone line simulator 530 to generate ringing voltage back to MCD 1. Again, it is important to obtain the quickest possible connection, inasmuch as protocol time-out factors may be a concern. Therefore, the parameters by which telephone line simulator 530 rings back to MCD 1 are optimized by a self-optimizing algorithm run upon power up. For example, while a standard ringing cycle might utilize 2 seconds voltage on and 4 seconds off, the optimizing parameters of 1 second on and 1 second off may still be functionally compatible with MCD 1. This would reduce the waiting period to one-third that of the standard period.

Off-hook detector 510 detects when MCD 1 responds to the ringing signal by going off-hook. With this detection routing, switch 520 changes state, thus connecting MCD 1 to PSTN 3. Off-hook detector 610 monitors the connection for on-hook status from PSTN 3 and MCD 1, and then returns to base-state condition.

Again, if MWI notification is anticipated, ESX 2 proceeds to check for MWI before returning to its base-state.

Note also that this processing accomplishes delivery from ESMH 4b to ESX 2 when PSTN 3 is disposed to provide automatic callback services, with the caveat about the possibility of both sides accepting responder roles, as noted in the Summary above, and discussed in the section on receive pickup below.

Notification Via Automatic Number Identification: If ESX 2 is disposed to notification via ANI of incoming calls, a different processing sequence is required. After initial detection of ringing by ringing voltage detector 640, Bell 212A modem 665 (e.g., Motorola MC145447) captures the ANI information and passes it on to micro-computer unit 700. If the ANI information matches that recorded in non-volatile read/write memory 710 indicating notification, call answering processing is not conducted, and processing proceeds to receive pickup, as described below.

Notification Via Message Waiting Indication: As described above, after any PSTN connection path has been terminated, ESX 2 may be disposed to check for an MWI signal on the line. The MWI signal would indicate that ESMH 4b has instructed PSTN 3 to notify ESX 2 of DEM data stored for retrieval by MCD 1. The characteristics of the MWI signal are specifically defined by the PSTN, and ESX 2 is configured to check for such characteristics. If the MWI signal indicates that DEM data is awaiting retrieval, processing proceeds to receive pickup, as described below. Otherwise, ESX 2 returns to base-state.

Notification Processing Via ESMH Signaling: Following up on the discussion of receiving-side initiation above, when the pre-defined wake-up signal from ESMH 4b is perceived via DTMF receiver 670 (e.g., Teltone M8880) or Bell 212A modem 665 within the pre-specified time interval, micro-computer unit 700 is disposed to respond. Its response is based on parameters provided through non-volatile read/write memory 710, as described above in the discussion of notification and parameter setting. ESX 2 will acknowledge receipt of the wake-up signal through DTMF generator 680 and off-hook transformer 630. Notification signal 225 (see FIG. 10a) will then be sent by ESMH 4b, and perceived through DTMF receiver 670. ESX 2 will then acknowledge that in the same manner as it acknowledged the wake-up signal. The optional session identification signal 290 from ESMH 4b will also be detected, and both sides will disconnect. Processing then proceeds to receive pickup, as described below.

Receive Pickup: Immediately upon receipt of notification via either method described in the preceding two paragraphs, off-hook load transformer 630 provides for a momentary on-hook appearance to PSTN 3, then returns to off-hook appearance. DTMF generator 680 then generates the DTMF digits corresponding to the address of a receive-side (mailbox) port on ESMH 4b. Progress tone energy detector 650 and precise progress tone detector 660 are disposed to detect connection conditions with ESMH 4b. Upon successful connection, micro-computer unit 710 conducts receive-side protocol with ESMH 4b to prepare for receive-side pickup. Again, this protocol is likely to be DTMF-based, as discussed above under "alternative path routing."

Finally, after completion of the protocol, ESX 2 is ready for DEM data transfer. Ring-back processing as identified above under "receive-side bypass" is then conducted, followed by DEM data transfer between ESMH 4b and MCD 1. Off-hook detector 610 monitors the connection for on-hook status from PSTN 3 and MCD 1, and then returns to base-state condition.

Note that, as with other instances of follow-up after the telephone line was in use, if ESX 2 is disposed to expect MWI notification (see above), it will perform a notification check immediately after returning to base-state. While this may appear to be unnecessary, it accounts for the possibility that DEM data was received on behalf of MCD 1 during the pickup, but was not appended to the DEM data already in transfer. Since ESMH 4b may allow notification processes and delivery processes to act independently, notification of new DEM data availability may actually coincide with delivery of previously-stored DEM data.

Remote Access Processing: When a wake-up signal is identified, but it is followed by an identification request 230 instead of being followed by a notification signal, ESX 2 would perceive this as indicating that ESMH 4b is intending to conduct remote query, updating, or both, of ESX 2. During this process, signaling from ESMH 4b is detected via DTMF receiver 670 (or serial communication interface 760), and returned by ESX 2 to ESMH 4b through DTMF generator 680 (or serial communication interface 760). Parameters for conducting this protocol are generally supplied by non-volatile read/write memory 710. However, optional serial number ROM 730, if used, could provide a unique, unalterable identification of each ESX unit. This identification could be used by ESMH 4b to verify that a particular ESX 2 unit has not been moved or tampered with.

Processing Status Display

As send-side success or failure milestones are encountered and reported to micro-computer unit 700, it may use display driver 740 to notify end-users of the progress of the DEM data delivery, provide input to a serial communications device using communications interface 760 identifying the progress made, or both. As receive-side notifications and ensuing pickup functions are invoked by micro-computer unit 700, the same processes and components are invoked to identify such actions to the end-user. Remote access protocols may also be identified using these processes and components.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for transmitting and receiving digitally encoded data comprising:
   (a) a first message communicating device;
   (b) an enhanced service exchange device having a customer side and a public side, the enhanced service exchange device being in exclusive and dedicated communication on its customer side through a private connection with the first message communicating device, and in communication over a public line with a public-switched telephone network on its public side, the public line being part of the public-switched telephone network; and
   (c) an enhanced service message handler in communication with the public-switched telephone network,
   wherein the enhanced service exchange device comprises means for determining the availability of point-to-point communication with a second message communicating device via the public-switched telephone network, and
   wherein the enhanced service exchange device further comprises means for automatically establishing a communication path to the enhanced service message handler when it determines that point-to-point communication is not available.

2. The system of claim 1, wherein the enhanced service message handler further comprises means for attempting direct delivery of digitally encoded messages to the enhanced service exchange device.

3. The system of claim 1, wherein the enhanced service message handler further comprises means for determining that the enhanced service exchange device is not available for direct reception of digitally encoded messages, and also comprises means for notifying the enhanced service exchange device that digitally encoded messages are available for pickup.

4. The system of claim 3, wherein the enhanced service message handler further comprises means for notifying the enhanced service exchange device that at least one digitally encoded message is available to be picked up, without connecting any forwarded calls back to itself.

5. The system of claim 4, wherein the enhanced service exchange device further comprises means for attempting to complete a direct connection with the public switched telephone network within a predetermined first time interval.

6. The system of claim 5, wherein the enhanced service message handler further comprises means for attempting to complete a connection between the enhanced service message handler and the public switched telephone network, initiated by the second message communicating device, through the public switched telephone network, only after a predetermined second time interval, said second time interval being longer than the first time interval.

7. The system of claim 6, wherein the enhanced service message handler further comprises means for terminating connection to the enhanced service exchange device, through the public switched telephone network, after a predetermined third time interval, said third time interval being longer than the first time interval but shorter than the second time interval.

8. The system of claim 3, wherein the enhanced service message handler further comprises means for communicating a message waiting indication signal to the enhanced service exchange device.

9. The system of claim 3, wherein the enhanced service message handler further comprises means for requesting the public-switched telephone network to identify the enhanced service message handler as the calling party, as it attempts to establish a connection between the enhanced service message handler and the enhanced service exchange device.

10. A method for delivering digitally encoded messages using an enhanced service exchange device having a customer side and a public side comprising:

(a) transmitting digitally encoded messages from a first message communicating device, in exclusive and dedicated communication through a private connection with the customer side of the enhanced service exchange device, through the public side of the enhanced service exchange device over a public telephone line to a second message communications device, wherein the public telephone line is part of the public-switched telephone network;

(b) attempting a first-option point-to-point delivery from the enhanced service exchange device over the public telephone line to the second message communicating device via the public-switched telephone network;

(c) monitoring the success of the first-option delivery attempt; and (d) upon detecting failure of the first-option delivery attempt, automatically re-routing the delivery of the digitally encoded message over the public-switched telephone system to the enhanced service message handler.

11. The method of claim 10, wherein the enhanced service exchange device is passive during the successful point-to-point delivery of digitally encoded messages.

12. A method for delivering and receiving digitally encoded messages comprising:

(a) attempting to establish a point-to-point connection for delivering a digitally encoded message from a first message communicating device to a second message communicating device via a public-switched telephone network;

(b) detecting the success or failure of the attempt to establish the point-to-point connection;

(c) if the attempt succeeds, delivering the digitally encoded message from the first message communicating device to the second message communicating device;

(d) if the attempt fails, delivering the digitally encoded message to an enhanced service message handler;

(e) attempting to establish a connection from the enhanced service message handler to the second message communicating device via the public-switched telephone network;

(f) detecting whether the attempt to establish the connection from the enhanced service message handler to the second message communicating device was successful within a first predetermined time interval;

(g) if the attempt is successful, delivering the message from the enhanced service message handler to the second communications device;

(h) if the attempt is unsuccessful, terminating the attempt after a second predetermined time interval, wherein the second time interval is longer than the first time interval;

(i) waiting for a third predetermined time interval;

(j) repeating steps (e) through (i) until a connection is successfully established; and (k) delivering the digitally encoded message from the enhanced service message handler to the second message communicating device.

13. The method of claim 12, wherein an enhanced service exchange device is positioned between the second message communicating device and the public-switched telephone network, and wherein the connections to the second message communicating device are made through the enhanced service exchange device.

14. The method of claim 13, wherein the enhanced service exchange device waits for a fourth predetermined time interval after a connection is successfully established between the enhanced service message handler and the enhanced service exchange device before establishing a connection to the second message communicating device.

15. The method of claim 14, wherein the enhanced service exchange device initiates the connection with the second message communicating device using telephony signals, if needed to emulate the digitally encoded data transfer protocol.

16. The method of claim 13, wherein the enhanced service message handler transmits wake-up signals to the enhanced service exchange device, the wake-up signals identifying the source of the signals as the enhanced service message handler, to initiate the connection between the enhanced service message handler and the enhanced service exchange device.

17. The method of claim 16, wherein the enhanced service exchange device responds to the wake-up signal by acknowledging receipt of the wake-up signals, confirming the establishment of a two-way interactive protocol with the enhanced service message handler.

18. The method of claim 17, wherein the enhanced service exchange device further comprises means for allowing its parameters to be updated remotely by the enhanced service message handler.

19. The method of claim 13, wherein the enhanced service exchange device provides its end-user with the capability of updating some of its parameters locally.

20. The method of claim 13, wherein the enhanced service exchange device comprises means for transmitting the status information of the enhanced service exchange device, and also comprises means for displaying the status information.

21. In a digital message delivery system comprising a first message communicating device in direct communication with a public-switched telephone network, said public-switched telephone network being in direct communication with an enhanced service message handler and, over a public telephone line, with an enhanced service exchange device, said enhanced service exchange device having a customer side and a public side, the customer side of the enhanced service exchange device being in direct exclusive and dedicated communication over a private telephone line with a second message communicating device, a method for delivering and receiving digitally encoded messages from the first message communicating device to the second message communicating device comprising:

(a) attempting to establish a point-to-point connection for delivering the digitally encoded message from the first message communicating device to the second message communicating device, via the public-switched telephone network including the public telephone line, and the enhanced service exchange device;

(b) detecting the success or failure of the attempt to establish the point-to-point connection;

(c) if the attempt succeeds, delivering the digitally encoded message from the first message communicating device to the second message communicating device via the public-switched telephone network and the enhanced service exchange device;

(d) if the attempt fails, delivering the digitally encoded message to the enhanced service message handler;

(e) attempting to establish a notification connection to the enhanced service exchange device;

(f) determining if the notification connection was successfully established;

(g) if the notification connection was successfully established, notifying the enhanced service exchange device that a digitally encoded message is available to be picked up, and terminating the notification connection;

(h) if the attempt to establish a notification connection was not successfully established within a first time interval, terminating the attempt;

(i) waiting a second predetermined time interval, and repeating steps (e)–(h) until a notification connection is successfully established;

(j) once the enhanced service exchange device has been notified that a digitally encoded message is waiting to be picked up, causing the enhanced service exchange device to establish a pick up connection from the enhanced service message handler to the second message communicating device;

(k) causing the enhanced service message handler to transfer the digitally encoded message to the second message communicating device via the public-switched telephone network and the enhanced service exchange device.

22. The method of claim 21, wherein the enhanced service message handler transmits wake-up signals to the enhanced service exchange device, the wake-up signals identifying the source of the signals as the enhanced service message handler.

23. The method of claim 22, wherein the enhanced service exchange device responds to the wake-up signal by acknowledging receipt of the wake-up signals, confirming the establishment of a two-way interactive protocol with the enhanced service message handler.

24. The method of claim 23, wherein the enhanced service exchange device further comprises means for allowing its parameters to be updated remotely by the enhanced service message handler.

25. The method of claim 21, wherein the enhanced service exchange device provides its end-user with the capability of updating some of its parameters locally.

26. The method of claim 21, wherein the enhanced service exchange device comprises means for transmitting the status information of the enhanced service exchange device, and also comprises means for displaying the status information.

27. In a digital message delivery system comprising a first message communicating device in direct communication with a public-switched telephone network, said public-switched telephone network being in direct communication with an enhanced service message handler and with an enhanced service exchange device, said enhanced service exchange device having a customer side and a public side, the customer side of the enhanced service exchange device being in direct exclusive and dedicated communication with a second message communicating device through a private connection, the public side of the enhanced service exchange device being in communication over a public telephone line with the public-switched telephone network, a method for delivering and receiving digitally encoded messages from the first message communicating device to the second message communicating device comprising:

(a) attempting to establish a point-to-point connection for delivering the digitally encoded message from the first message communicating device to the second message communicating device via the public-switched telephone network and the enhanced service exchange device;

(b) detecting the success or failure of the attempt to establish the point-to-point connection;

(c) if the attempt succeeds, delivering the digitally encoded message from the first message communicating device to the second message communicating device via the public-switched telephone network and the enhanced service exchange device;

(d) if the attempt fails, delivering the digitally encoded message to the enhanced service message handler;

(e) notifying the enhanced service exchange device that the enhanced service message handler has a digitally encoded message awaiting pick-up via automatic number identification; and (f) causing the enhanced service exchange device to pick up the digitally encoded message from the enhanced service message handler.

28. The method of claim 27, wherein the enhanced service message handler transmits identification signals to the enhanced service exchange device, the identification signals identifying the source of the signals as the enhanced service message handler, to initiate the notification connection between the enhanced service message handler and the enhanced service exchange device.

29. The method of claim 28, wherein the enhanced service exchange device initiates a two-way interactive protocol with the enhanced service message handler by acknowledging receipt of the identification signals.

30. The method of claim 29, wherein the enhanced service exchange device further comprises means for allowing its parameters to be updated remotely by the enhanced service message handler.

31. The method of claim 27, wherein the enhanced service exchange device provides its end-user with the capability of updating some of its parameters locally.

32. The method of claim 27, wherein the enhanced service exchange device comprises means for transmitting the status information of the enhanced service exchange device, and also comprises means for displaying the status information.

33. In a digital message delivery system comprising a first message communicating device in direct communication with a public-switched telephone network, said public-switched telephone network being in direct communication with an enhanced service message handler and with an enhanced service exchange device, said enhanced service exchange device having a customer side and a public side, the customer side of the enhanced service exchange device being in direct exclusive and dedicated communication through a private connection with a second message communicating device, wherein said enhanced service exchange device is in communication via its public side over a public telephone line with the public-switched telephone network, a method for delivering and receiving digitally encoded messages from the first message communicating device to the second message communicating device comprising:

(a) attempting to establish a point-to-point connection for delivering the digitally encoded message from the first message communicating device to the second message communicating device via the public-switched telephone network and the enhanced service exchange device;

(b) detecting the success or failure of the attempt to establish the point-to-point connection;

(c) if the attempt succeeds, delivering the digitally encoded message from the first message communicating device to the second message communicating device via the public-switched telephone network and the enhanced service exchange device;

(d) if the attempt fails, delivering the digitally encoded message to the enhanced service message handler;

(e) notifying the enhanced service exchange device that the enhanced service message handler has a digitally encoded message awaiting pick-up via message waiting indication; and (f) causing the enhanced service exchange device to pick up the digitally encoded message from the enhanced service message handler.

34. The method of claim 33, wherein the enhanced service message handler transmits identification signals to the enhanced service exchange device, the identification signals identifying the source of the signals as the enhanced service message handler, to initiate the notification connection between the enhanced service message handler and the enhanced service exchange device.

35. The method of claim 34, wherein the enhanced service exchange device responds to the identification signals.

36. The method of claim 33, wherein the enhanced service exchange device provides its end-user with the capability of updating some of its parameters locally.

37. The method of claim 33, wherein the enhanced service exchange device further comprises means for allowing its parameters to be updated remotely by the enhanced service message handler.

38. The method of claim 34, wherein the enhanced service exchange device comprises means for transmitting the status information of the enhanced service exchange device, and also comprises means for displaying the status information.

39. A system for receiving and transmitting digitally encoded messages comprising:

(a) a first message communicating device;

(b) an enhanced service exchange device having a customer side and a public side, the public side being in direct communication with a public-switched telephone network over a public line, the customer side of the enhanced service exchange device being in direct exclusive and dedicated communication through a private connection with the first message communicating device, comprising:

(i) means for attempting to establish a point-to-point connection for delivering digitally encoded messages, communicated to the enhanced service exchange device by the first message communicating device, to a second message communicating device via the public-switched telephone network, (ii) means for detecting the success or failure of the point-to-point attempt, and (iii) means for transmitting the digitally encoded message to the second message communicating device, over the public-switched telephone network, if the point-to-point connection is successfully established; and (c) an enhanced service message handler comprising:

($\alpha$) means for attempting to establish a connection to the enhanced service exchange device, ($\beta$) means for detecting the success or failure of the attempt to establish the connection to the enhanced service exchange device, ($\gamma$) means for transmitting a digitally encoded message to the enhanced service exchange device, over the public-switched telephone network, if the connection to the enhanced service exchange device is successfully established, and ($\delta$) means for repeatedly performing the functions implemented by the means described in ($\alpha$)–($\gamma$) until a successful connection is established, wherein the enhanced service exchange device also comprises means for transmitting the digitally encoded message to the enhanced service message handler, over the public-switched telephone network, if the point-to point communication is not successfully established.

40. The system of claim 39, wherein the means, in the enhanced service message handler, for detecting the success or failure of the attempt to establish the connection to the enhanced service exchange device, comprises means for determining whether the attempt was successful within a first predetermined time interval.

41. The system of claim 40, wherein the means, in the enhanced service message handler, for detecting the success or failure of the attempt to establish the connection to the enhanced service exchange device, comprises means for terminating the attempt after a second predetermined time interval, wherein the second predetermined time interval is longer than the first predetermined time interval.

42. The system of claim 41, wherein the means, in the enhanced service message handler, for attempting to establish a connection to the enhanced service exchange device, comprises means for waiting for a third predetermined time interval.

43. The system of claim 42, wherein the enhanced service exchange device comprises means for waiting for a fourth predetermined time interval before establishing a connection to the first message communicating device.

44. The system of claim 39, wherein the enhanced service message handler further comprises means for transmitting identification signals identifying the source of the signals as the enhanced service message handler.

45. The system of claim 44, wherein the enhanced service exchange device further comprises means for initiating a two-way interactive protocol by acknowledging the receipt of the identification signals.

46. The system of claim 45, wherein the enhanced service exchange device further comprises means for allowing its parameters to be updated remotely by the enhanced service message handler.

47. The system of claim 39, wherein the enhanced service exchange device further comprises means for providing its end-user with the capability of updating some of its parameters locally.

48. The system of claim 39, wherein the enhanced service exchange device further comprises means for transmitting the status information of the enhanced service exchange device, and also comprises means for displaying the status information.

* * * * *